T. P. BENTON.
Millstone-Dressing Machine.

No. 222,443. Patented Dec. 9, 1879.

Witnesses:
P. C. Dietrich.
Jno. A. Stockman.

Inventor
Thomas P. Benton.
Per C. H. Watson & Co. Attorneys.

UNITED STATES PATENT OFFICE.

THOMAS P. BENTON, OF LA CROSSE, WISCONSIN.

IMPROVEMENT IN MILLSTONE-DRESSING MACHINES.

Specification forming part of Letters Patent No. 222,443, dated December 9, 1879; application filed June 13, 1879.

*To all whom it may concern:*

Be it known that I, THOMAS P. BENTON, of La Crosse, in the county of La Crosse and State of Wisconsin, have invented certain new and useful Improvements in Diamond Millstone-Dressing Machines; and I do hereby declare that the following is a full, clear, and exact description of the invention, which will enable others skilled in the art to which it appertains to make and use the same, reference being had to the accompanying drawings, and to the letters of reference marked thereon, which form a part of this specification.

The nature of my invention consists in the construction and arrangement of a diamond millstone-dressing machine, as will be hereinafter more fully set forth.

Figure 1:
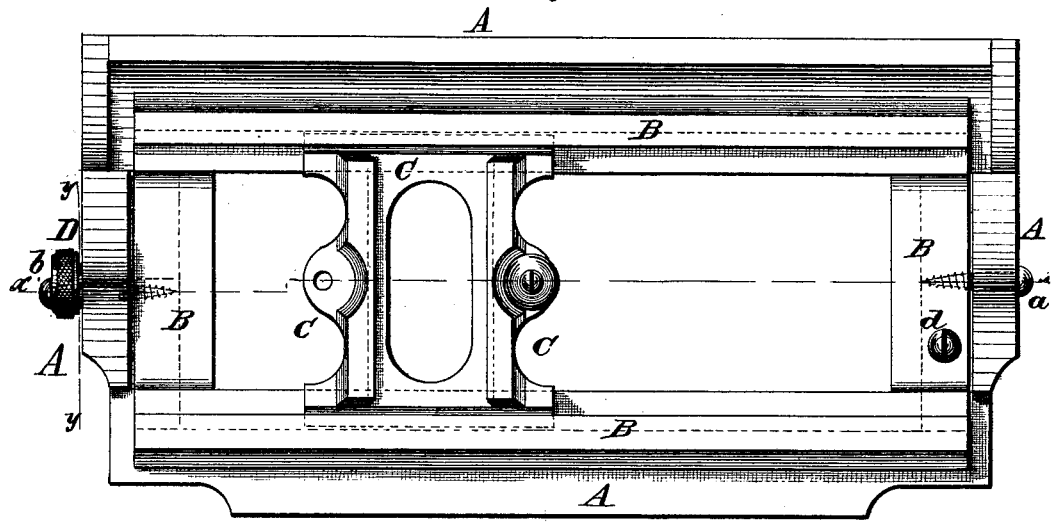
Figure 2:
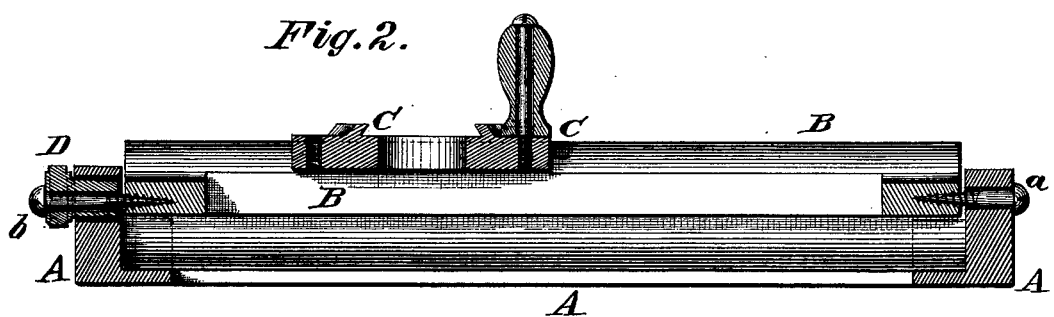
Figure 3:
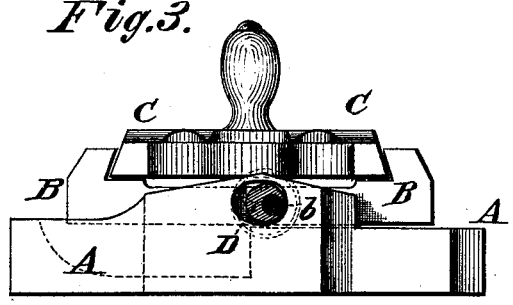
Figure 4:
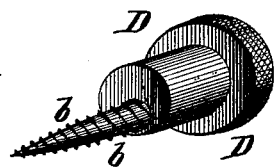

In the annexed drawings, to which reference is made, and which fully illustrate my invention, Figure 1 is a plan view of my invention. Fig. 2 is a central vertical section on line $x\,x$, Fig. 1. Fig. 3 is a section on line $y\,y$, Fig. 1, and Fig. 4 is a detached view of the eccentric D.

A represents the staff-bed, and B is the frame forming the ways upon which the carriage C is worked. The frame B is fastened at one of its ends by a bolt, $a$, which admits of its being inclined to the right for the purpose of furrowing the millstone. At the other end the frame B is also fastened by a bolt, $b$. This bolt, however, passes through an eccentric, D, inserted in the bed, and the working of which raises and lowers the frame to cut deeper at the eye of the stone if required, and to adjust the cut of the diamond to the staffing.

At one end of the bed is a screw, $d$, through the ways or frame B, to hold the same level after furrowing. The carriage C is to be provided with suitable gibs to adjust it to the ways.

Having thus fully described my invention, what I claim as new, and desire to secure by Letters Patent, is—

1. In a millstone-dressing machine, the eccentric D, pivot-screw $a$, and screw $b$, in combination with the staff-bed A and ways or frame B, for the purposes herein set forth.

2. The combination of the bed A, ways or frame B, pivot-screw $a$, eccentric D, with screw $b$, and the binding-screw $d$, substantially as and for the purposes herein set forth.

In testimony that I claim the foregoing as my own I have hereto affixed my signature in presence of two witnesses.

THOMAS P. BENTON.

Witnesses:
MINNIE E. JENKS,
JOHN JAMES.